United States Patent [19]
Battistini et al.

[11] Patent Number: 6,087,927
[45] Date of Patent: *Jul. 11, 2000

[54] ORDER COMMUNICATION SYSTEM FOR RESTAURANT

[75] Inventors: Michael Battistini, Greenville; Gene Battistini, Greer, both of S.C.

[73] Assignee: Techknow, Inc., Greenville, S.C.

[ * ] Notice: This patent is subject to a terminal disclaimer.

[21] Appl. No.: 09/313,161

[22] Filed: May 17, 1999

Related U.S. Application Data

[63] Continuation-in-part of application No. 09/016,098, Jan. 30, 1998, Pat. No. 5,907,275.

[51] Int. Cl.$^7$ .................................................. G08B 1/00
[52] U.S. Cl. .................. 340/286.09; 340/286.06
[58] Field of Search .................... 340/286.09, 285.35, 340/942, 286.06; 348/14, 61, 15, 13, 153; 705/15, 16, 26, 27, 35, 37

[56] References Cited

U.S. PATENT DOCUMENTS

| | | |
|---|---|---|
| 2,819,459 | 1/1958 | Dodd . |
| 2,912,066 | 11/1959 | Ellithorpe . |
| 3,294,342 | 12/1966 | McClure et al. . |
| 4,396,985 | 8/1983 | Ohara . |
| 4,638,312 | 1/1987 | Quinn et al. . |
| 4,675,515 | 6/1987 | Lucero . |
| 4,735,289 | 4/1988 | Kenyon . |
| 4,821,118 | 4/1989 | Lafreniere . |
| 4,865,420 | 9/1989 | Schmidt . |
| 4,942,464 | 7/1990 | Milatz . |
| 5,003,472 | 3/1991 | Perrill et al. . |
| 5,053,868 | 10/1991 | Higgins et al. . |
| 5,168,354 | 12/1992 | Martinez et al. . |
| 5,235,509 | 8/1993 | Mueller et al. . |
| 5,321,848 | 6/1994 | Miyahira et al. . |
| 5,482,139 | 1/1996 | Rivalto . |
| 5,657,246 | 8/1997 | Hogan et al. . |
| 5,717,568 | 2/1998 | Clutter et al. . |
| 5,901,067 | 5/1999 | Kao .......................................... 364/492 |
| 5,905,973 | 5/1999 | Yonezawa et al. ....................... 705/27 |
| 5,907,275 | 5/1999 | Battistini et al. .................. 340/286.09 |
| 5,907,604 | 5/1999 | Hsu ........................................ 379/142 |
| 5,936,679 | 8/1999 | Kasahara et al. ....................... 348/553 |

FOREIGN PATENT DOCUMENTS 2044467  2/1992  Canada .

Primary Examiner—Jeffery A. Hofsass
Assistant Examiner—Anh V. La
Attorney, Agent, or Firm—Dority & Manning, P.A.

[57] ABSTRACT

An order communication system is provided which allows audiovisual interactive communication between a customer at a remote order station and an attendant receiving orders in a restaurant. The order communication system allows flexible display programming by restaurant employees and in particular allows the customer to view textual descriptions and/or graphical depictions of ordered items. The order communication system also allows the customer to view live video of the attendant, while allowing the attendant to view live video of the customer as well as the video image the customer is seeing.

21 Claims, 8 Drawing Sheets

ORDER COMMUNICATION SYSTEM FOR RESTAURANT

This application is a Continuation-in-Part (CIP) application of U.S. patent application Ser. No. 09/016,098, filed Jan. 30, 1998 now U.S. Pat. No. 5,907,275.

TECHNICAL FIELD OF THE INVENTION

The present invention relates to an improved order placement system allowing interactive audiovisual communication between a customer at a remote order station and an attendant receiving orders, such as may be used in a restaurant.

BACKGROUND OF THE INVENTION

Order communication systems have been designed to allow a customer to place an order from a remote station and an employee to take the order while inside a business establishment, typically a fast food restaurant. This arrangement provides the customer the convenience of placing and picking up orders without leaving the car, and allows employees of the business establishment to more efficiently serve customers using two avenues: inside and drive-through.

In the usual scenario, a customer drives his car around the building to a marked location and stops in front of a speaker and menu board. The menu board lists the available items for order and their prices, and an audio system connected to the speaker generally allows two-way communication between the customer and an attendant inside the building. The customer places an order which the attendant records in a point-of-sale system. The attendant verifies the customer order and typically tells the customer the total amount owed. The order is then relayed to employees who fill the order. In a restaurant establishment, the order is sent to the grill area where kitchen employees cook and package the food. At the same time, the customer drives to a window in the building where he may speak with the attendant face to face. The customer pays the amount owed and subsequently receives his order.

Two well-known disadvantages to a drive-through order placement system are inaccuracies in filling orders and the lack of personal service. A main contributor to the problem of mistakes in orders is inefficient communication through the audio system. To address this problem, order communication systems have been designed with improved audio capability.

Further, audiovisual functionality has been included in order communication systems which allows the customer to see a textual indication of each ordered item for verifying purposes. However, this type of verification is piecemeal and, further, is wholly ineffective for the significant number of customers with language barriers or who otherwise have difficulty reading English.

Additionally, audiovisual order systems have been designed which allow the customer to see the image of the order taking attendant, which creates a feeling of personal service.

Poor audio quality in prior art systems also creates inefficiency in the ordering process. When the customer is unable to hear his order repeated, he cannot verify its accuracy and must do so at the window when he is speaking with the attendant. The customer may also have difficulty hearing or simply ignore the attendant when he relates the total amount owed on the order. This also causes a delay when the customer reaches the window.

Prior art systems also present disadvantages with regard to security matters. When a customer cannot verify his order visually, the chance of employee misconduct, such as overpricing, is increased. Similarly, when the attendant has no visual access to the customer, the occurrence of prank orders may be increased. More importantly, allowing the attendant to view the customer may prevent more serious activity such as theft or violence.

Finally, prior art systems have failed to recognize a golden marketing opportunity. Typically, prior art systems allow only static promotional materials which must be changed or updated by hand and are prime targets for vandalism. The ability to post special announcements, such as hiring notices, is very limited. Thus, prior art systems provide little flexibility among franchisees of businesses.

Accordingly, it can be seen that a need exists for an order communication system which provides both audio and visual interactive communication between a drive-through customer and an attendant. Further, a need exists for an order system which may be easily and efficiently managed, and allows flexible programming to achieve optimal promotional value.

SUMMARY OF THE INVENTION

The present invention recognizes and addresses the foregoing disadvantages, and others, of prior art construction and methods.

Accordingly, it is an object of the present invention to provide an improved design for an order placement system which allows interactive audiovisual communication between an employee receiving orders and a customer at a remote order station.

More particularly, it is an object of the present invention to provide an order communication system with improved efficiency and accuracy by allowing the customer to verify orders visually, through text and/or pictures, and allowing employees to control the visual information that customers receive.

It is also an object of the present invention to personalize drive-through service by providing both the customer and the attendant with live video of the other party to the transaction.

It is an additional object of the present invention to allow customer verification of orders regardless of customer's ability to read English by using color pictures of ordered items.

It is a still further object of the present invention to create customized marketing outlets at remote order stations.

It is still a further object of the present invention to increase the speed of the order taking process by allowing the attendant to direct customers with text and to display the total amount owed before the customer proceeds to the attendant window.

It is still a further object of the present invention to provide flexible programming of the customer monitor display areas.

It is still a further object of the present invention to increase security at a remote order station by allowing the attendant visual access to that area.

It is still a further object of the present invention to improve efficiency by allowing the attendant to view on an inside monitor the live video which the customer sees outside.

It is a still further object of the present invention to provide an outside order station with a customer monitor enclosure so that the monitor is protected from weather and the effects of glare.

It is a still further object of the present invention to provide a standalone order communication system which has the capability to retrieve and relay order information to an existing order filling process.

It is a still further object of the present invention to position the inside camera and attendant monitor conveniently adjacent to the attendant's device for data entry for improved efficiency.

Additional objects and advantages of the invention will be set forth in part in the following description, or may be obvious from the description, or may be learned through practice of the invention.

Some of these objects are achieved by the design of an order system with interactive audiovisual capabilities having a stored catalog of graphic depictions and textual descriptions of all menu items. The interactive order system provides both audio and video links between at least one pair of order stations, including an order receiving station within the business establishment for use by employees of the business and an order placement station remote from the business establishment for use by ordering customers.

In addition to the typical two-way audio link between the two stations, the order system includes a video link through a centralized video controller providing switching mechanisms through which employees can determine the visual display shown to the customer. Each order placement station includes a customer monitor which may display simultaneously to the customer a graphical depiction and textual description of each item ordered. A textual listing of the entire order is displayed, including color-coded special order items. Additionally, the customer monitor displays the order total. The order system provides an employee of the business establishment the capability to otherwise choose the contents for display on the customer monitor.

In a preferred embodiment, this selection capability is provided through a computer with a central processing unit (CPU) and data storage for all textual and graphical displays to be sent to the customer monitor. The CPU further houses a mapping program which selects the display based on a selection code input by the employee. In a preferred embodiment, the selection code is retrieved from the typical point-of-sale (POS) system in place in many fast food restaurants and is input by the employee through a cash register in the order receiving station.

The order total, calculated by the cash register, can be retrieved in the same manner. Alternatively, the order total information may be calculated by the software on the CPU using pricing data residing in data storage. In one embodiment, the customer monitor may provide the customer with a display of the running total as items are ordered.

In a preferred embodiment, the interactive order system also provides the customer with a live video image of the order-taking employee on the customer monitor. An additional monitor is placed within the order receiving station for presenting a video image of the ordering customer to the order-taking employee. A camera for filming video of the customer is positioned above the customer monitor within the order placement station. This camera is equipped with the capability to adjust to various outside lighting conditions. A camera for filming the video of the order-taking employee is similarly positioned within the order receiving station.

In a preferred embodiment, the employee monitor also includes an inset image, often referred to as picture-in-picture (PIP), in which the employee may view the video being filmed by the camera within the order receiving station. In this embodiment, the employee may observe the video which the customer is seeing on the customer monitor.

In each embodiment which includes displaying live video, the centralized video controller links the camera in the order placement station, the camera in the order receiving station, the customer monitor, the employee monitor, and the software which allows an employee to choose the graphic display presented to the customer. Additionally, in a preferred embodiment, the video controller includes a sensor, such as a light sensor, connected with a vehicle detection sensor in the audio system which is activated by the presence of a customer at the order placement station.

In a preferred embodiment, the customer monitor is divided into a number of display fields. One display field is used for presenting a list of the textual descriptions of ordered items to the customer as they are ordered. A second display field is used for presenting real-time a graphic depiction of each ordered item. A third display field allows the employee to present to the customer a programmed textual message. A fourth display field is used for presenting the total cost owed on the order by the customer. The fifth display field can be used in a number of different ways.

In one embodiment, the fifth display field is used for the live video image of the order taking employee described above. In another embodiment, this display field is used for a series of animated graphics, usually for promotional purposes. In another embodiment, this display field is used for an informational video. In another embodiment, this display field is used for a static informational graphic, such as a graphical depiction of an item which might favorably be added to the customer's order. In each of the foregoing embodiments, employees of the business establishment may select the image to be shown using software provided on the CPU. Additionally, this software allows an employee to pre-program the textual message displayed in the third display field.

In another embodiment, the first display field is used for presenting a graphical catalog of all ordered items rather than textual descriptions. The second display field initially presents a graphic depiction of an item as it is ordered. When the next item is ordered or when the customer has finished ordering, the graphical depiction of the previously ordered item is removed from the second display field and joins other ordered items in the first display field.

In a preferred embodiment, the graphic depiction presented in the second display field is animated to show various ingredients as they are included with or excluded from the ordered item. In another embodiment, the graphic depiction presented in the second display field is a prerecorded video clip of the ordered item.

In a preferred embodiment, the software running on the CPU allows a managing employee to load and store all textual and graphical images to be used in the display fields on the customer monitor. Loading this information could be accomplished in a number of ways, including but not limited to simple data entry of text, transfer from tape or CD storage, or downloading over a network. The software presents selection screens through a graphical user interface (GUI) to allow the employee to select from among these images, to modify the images, and to determine the sequence in which they appear on the customer monitor. The software then works with the video controller to control the sequencing of images. The software also allows the entry of store hours of operation, so that appropriate screen saver graphics may be displayed at selected times, for example when the business is closed.

In a preferred embodiment, the order placement station is an enclosure housing the customer monitor and the speaker for the audio system. In one embodiment, the enclosure also houses a microphone placed at a point close to the customer for enhanced audio capability. In one embodiment, the enclosure also houses a camera for filming the customer. The enclosure protects the customer monitor, audio components, and camera from outdoor conditions, such as the inclement weather. Additionally, the enclosure provides a roof to shield glare from the customer monitor, which is positioned in the enclosure at an angle to create a diverging line of sight from the customer's viewpoint. In another embodiment, the customer monitor is a flat panel presented in portrait mode and including a light sensor to allow automatic adjustment of brightness depending on outside conditions.

In one embodiment the order communication system includes a leading customer monitor also housed in an enclosure, which is positioned to be observed by a customer waiting in a drive-through line. The leading customer monitor is used to present the same display options to a waiting customer as may appear on the customer monitor in the order placement station. These displays, normally for used promotional purposes, are chosen using the software housed on the CPU and relayed through the video controller.

In another embodiment, similar monitors for promotional purposes may be placed in the front of the business establishment to be viewed by indoor customers. For example, these monitors may be placed on or near the inside menu board or attached by brackets to the ceiling. Displays on these monitors are determined by employees using the software housed on the CPU and a separate video controller dedicated to these monitors.

Similarly, in another embodiment, the order system may include additional cameras for monitoring purposes. These cameras may be positioned at the front of the business establishment for monitoring in-store customers, or for recording video of employees working. Video from these cameras is sent to the CPU using a separate video controller dedicated to this monitoring task, and may be relayed to video recorders, a modem, or a network.

In another embodiment, the order system may include an additional monitor in the area of the business establishment used for filling orders. For example, in a fast food restaurant, the monitor would be positioned in the grill area. This monitor is used to present a listing of the textual descriptions of ordered items as the items are ordered just as the descriptions are listed on the customer monitor in the order placement station. This list is presented to help order-filling employees efficiently perform their tasks.

The accompanying drawings, which are incorporated in and constitute a part of this specification, illustrate the described embodiments of the invention and, together with the description, serve to explain the principles of the invention.

BRIEF DESCRIPTION OF THE DRAWINGS

A full and enabling disclosure of the present invention, including the best mode thereof and directed to one of ordinary skill in the art, is set forth in the specification, which makes reference to the appended drawings, in which.

Figure 1:
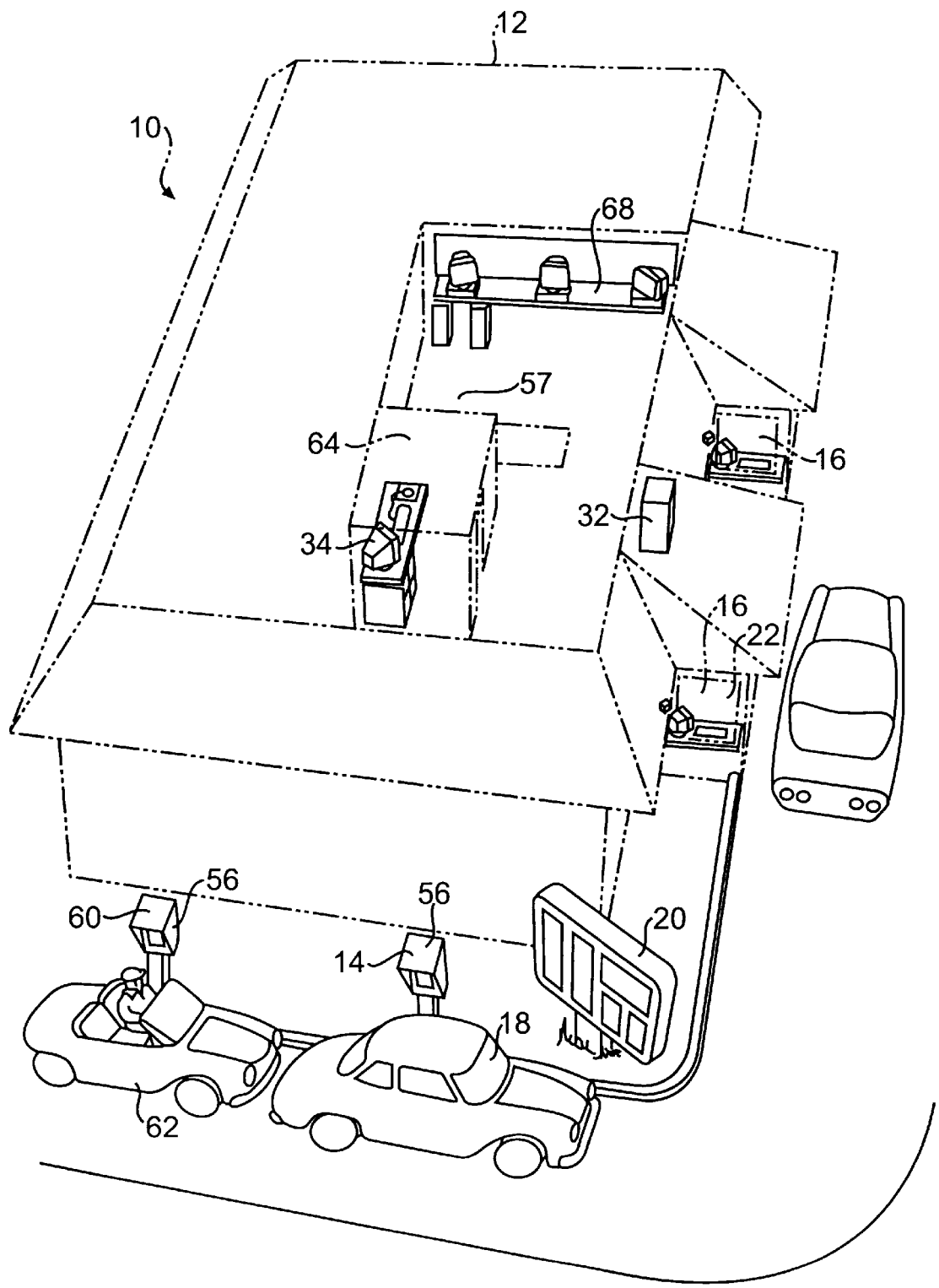
FIG. 1 is an overview of a business establishment in which an order communication system designed in accordance with the present invention and the process described by the present invention is in use.

Repeat use of reference characters in the present specification and drawings is intended to represent same or analogous features or elements of the invention.

DETAILED DESCRIPTION OF THE PREFERRED EMBODIMENT

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

The present invention is concerned with an improved order placement system allowing interactive audiovisual communication between a customer at a remote order station and an attendant receiving orders. Accordingly, FIG. 1 depicts a presently preferred embodiment of an interactive order communication system 10 in use in a business establishment, in this case a fast food restaurant 12. The order communication system 10 has at least one order placement station 14 remote from the restaurant 12 paired with an order receiving station 16 within the restaurant. The order communication system 10 allows an attendant (not shown) at the order receiving station 16 to communicate with a customer 18, typically in a car, at the order placement station 14. The customer 18 can observe a menu board 20 from the order placement station 14 and give his order to the attendant before driving around to a window 22 to collect the order.

Figure 2:
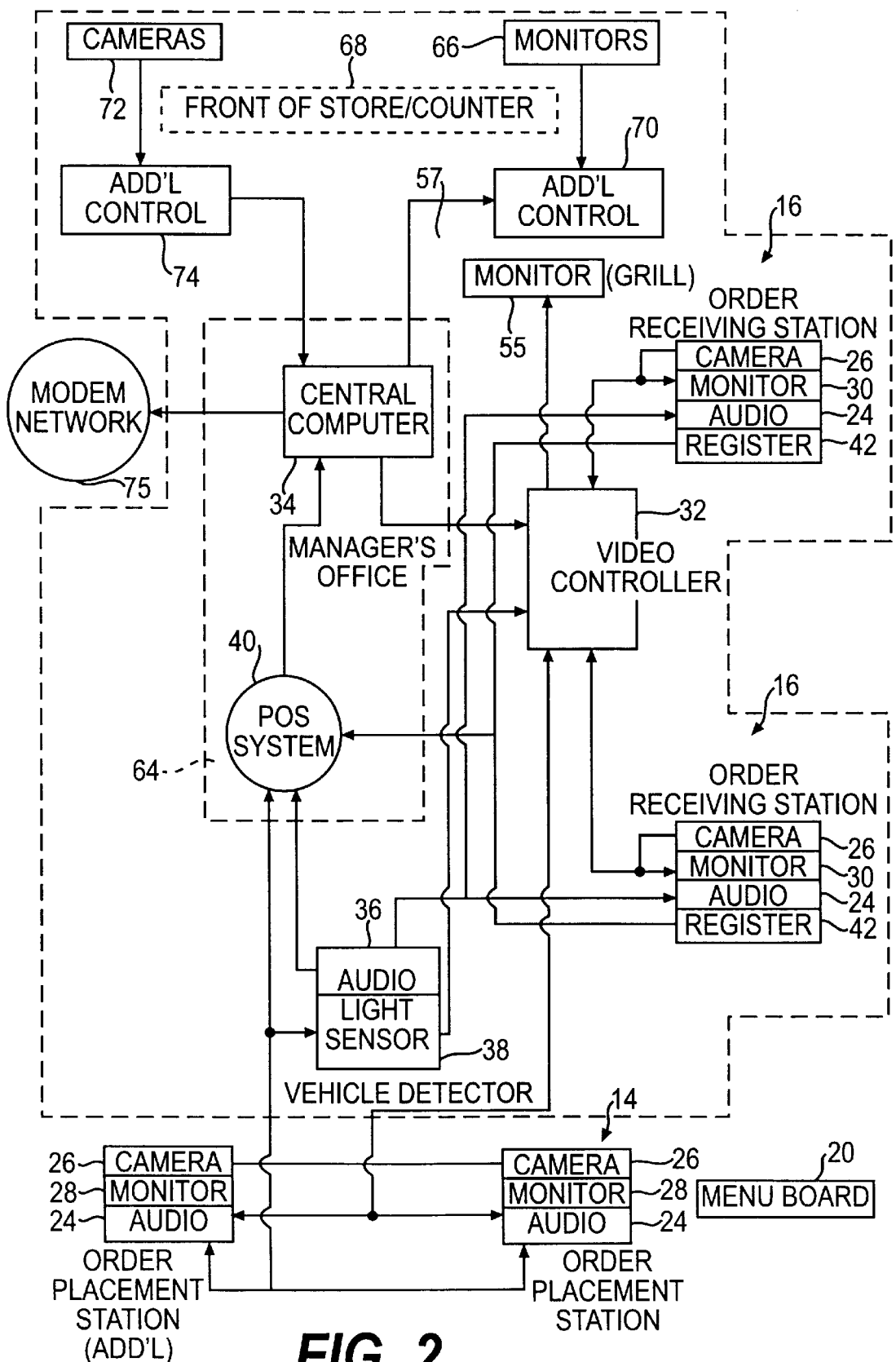
FIG. 2 is a block diagram showing the components of an order communication system designed in accordance with the present invention, the preferred position of each component within a business establishment, and the operational connections thereof.

The various components of the order communication system of the present invention and their connections are shown in FIG. 2. The order communication system provides audio communication between the customer and an attendant through a two-way audio link between the order placement system 14 and the order receiving station 16, both of which include a speaker 24 and may also incorporate a microphone (not shown) for enhanced audio capability. The order communication system 10 provides visual communication between the customer 18 and the attendant through a camera 26 and a customer monitor 28 at the order placement station 14, and a camera 26 and an employee monitor 30 at the order receiving station 16. Each camera 26 and monitor 28, 30 in the order communication system 10 is linked and controlled by a centralized video controller 32 which is also connected with a central computer 34.

In a typical scenario, the customer 18 approaches the order placement station 14 activating a vehicle detector 36 connected to the audio system which also activates a light sensor 38, indicating the presence of a customer. The vehicle detector notifies the regular audio system within the business establishment 12 and initiates audio communication. The light sensor 38 notifies the video controller 32 of the present invention which sends an initial display to the customer monitor 14.

The contents of the initial display are determined by an employee of the business establishment, typically a restaurant manager, using a catalog of such graphic displays stored on the central computer 34. One or more displays may cover the entire surface of the customer monitor 28 or a portion of the screen, as will be discussed later. The manager typically will have a choice of a number of different types of displays, such as a series of animated graphics, a static informational or promotional graphic, or an informational video.

The attendant initiates audio communication with the customer 18, and the customer chooses items he would like to order from the menu board 20. As the customer 18 communicates his order to the attendant through the speaker 24, the attendant enters a code for each item into the regular point-of-sale (POS) system 40 through a data entry device 42, typically a cash register, in the order receiving station 16. The item codes are retrieved by software running on the central computer 34. Mapping software on the central computer 34 uses these codes to retrieve from storage the textual description and/or the graphical depiction associated with that menu item.

Figure 4:
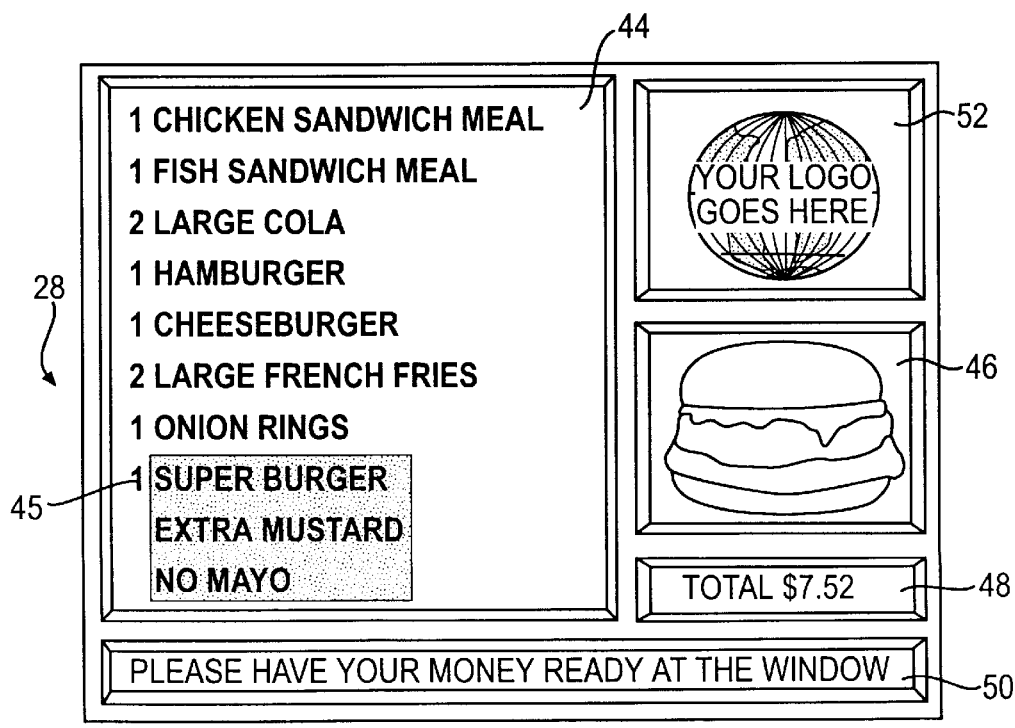
FIG. 4 is a view of one embodiment of a customer monitor included in the order communication system illustrated in FIG. 1 showing an exemplary display.

These representations of the ordered item are then displayed on the customer monitor 28. FIG. 4 shows an example of the display on the customer monitor 28 in a preferred embodiment of the present invention. Five separate display areas are defined. The order list area 44 displays the list in sequence of the textual descriptions of the items in the customer's order. The list includes highlighted special order items 45. The picture display area 46 displays the graphical depiction of each item ordered, preferably in the form of a color picture. As discussed above, these representations were retrieved from the central computer 34 and relayed to the customer monitor 28 through the video controller 32.

When the customer has completed making an order, he may verify the order by looking at the list displayed in the order list display area 44 and verbally verify the order with the attendant. The attendant then calculates the total amount owed on the order using the cash register 42, part of the regular POS system. The software running on the central computer 34 retrieves this total amount and relays it to the customer monitor 28 where it is displayed in the order total display area 48 shown in FIGS. 4, 7, and 8. Alternatively, the total may be calculated by the software on the central computer 34. The customer may then proceed to the window 22 to pick up his order.

Figure 7:
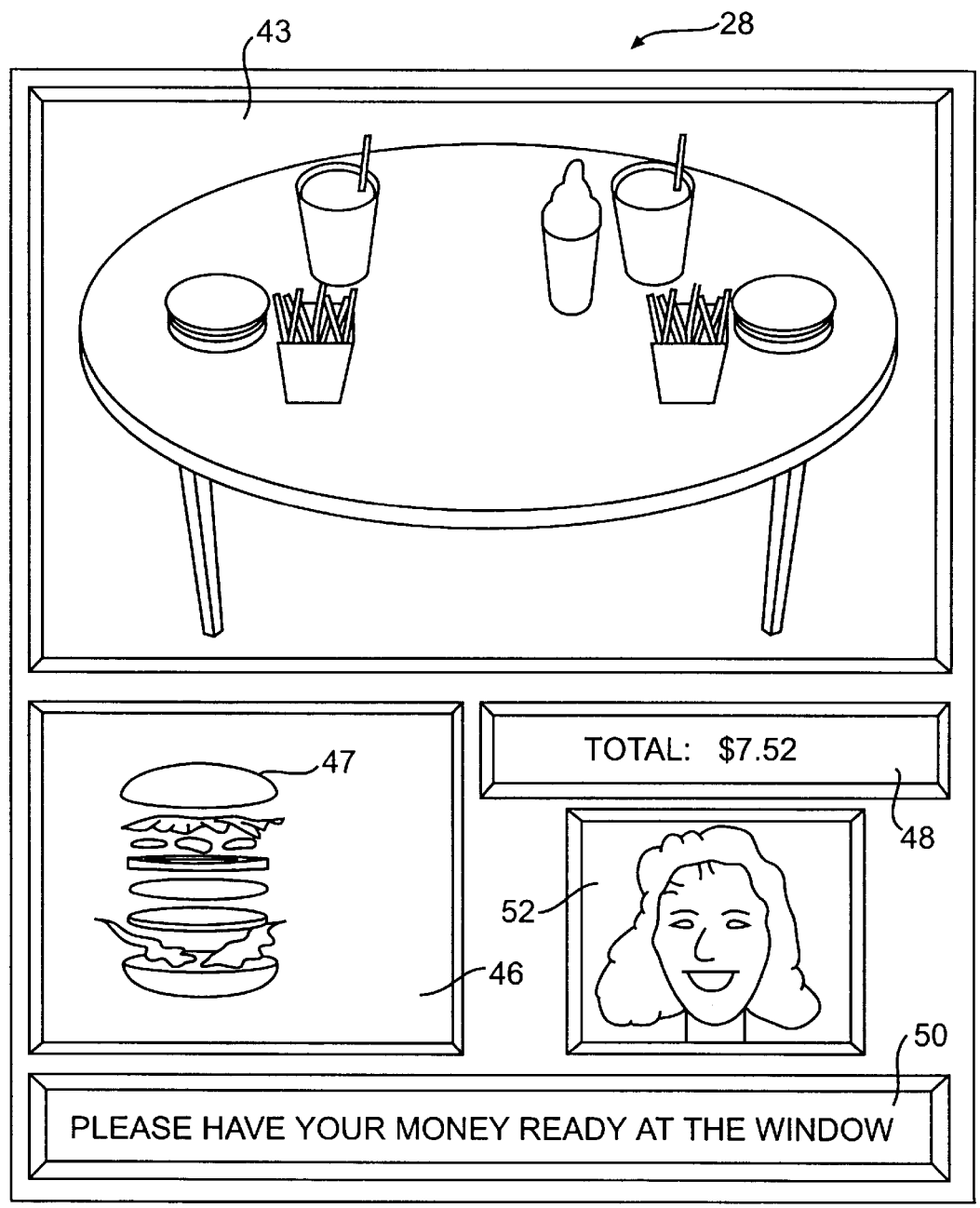
FIG. 7 is a view of one embodiment of a customer monitor included in the order communication system illustrated in FIG. 1 showing an exemplary display.
Figure 8:
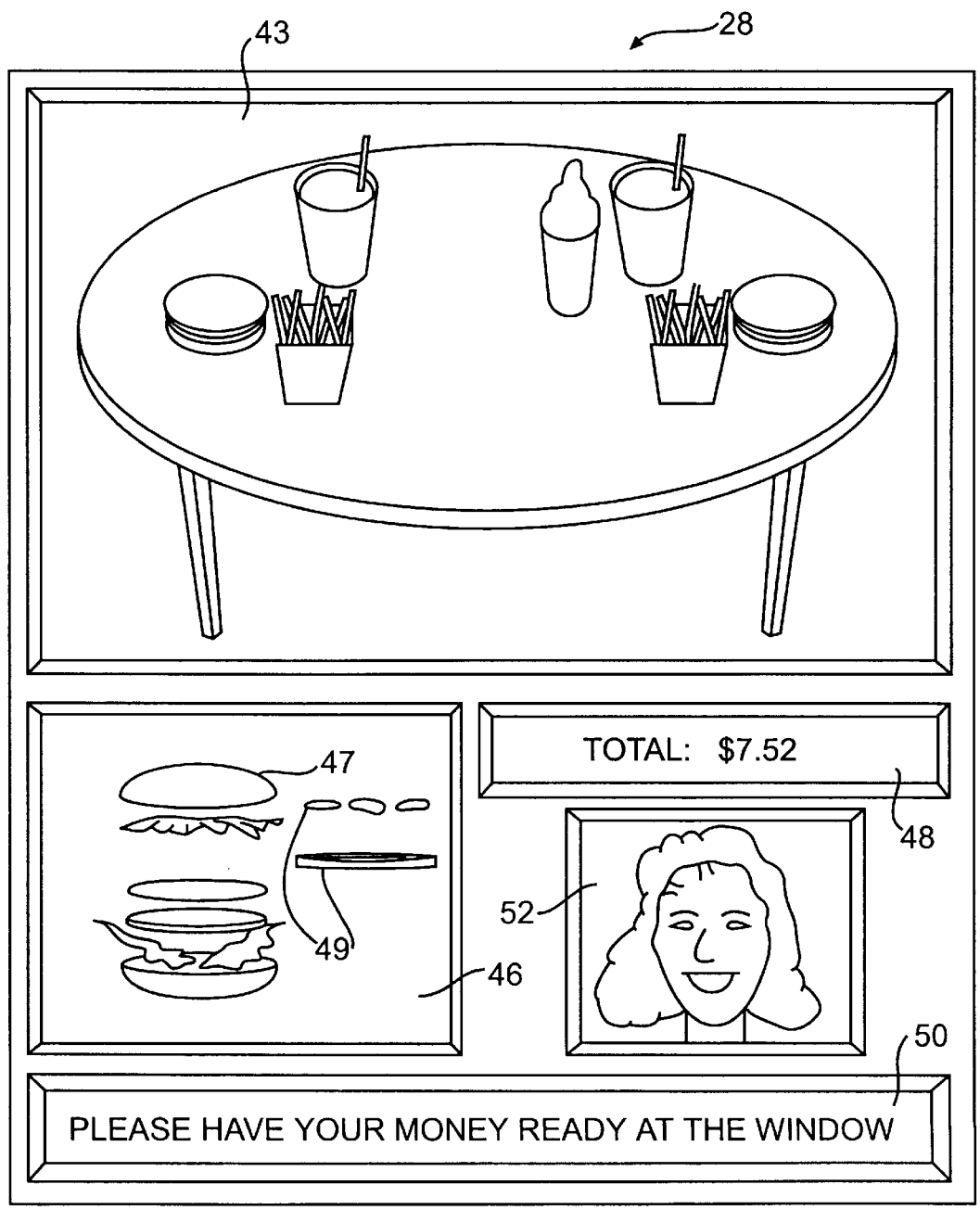
FIG. 8 is a view of the embodiment of a customer monitor illustrated in FIG. 7 showing an exemplary display.

An example of the display on the customer monitor 28 in another preferred embodiment of the present invention is illustrated in FIGS. 7 and 8. In this embodiment, the order list area 44 is replaced with the visual catalog area 43. The visual catalog area 43 presents a graphical summary of the items in the customer's order. A graphical depiction of each item ordered by the customer is included in the visual catalog area 43. As the customer orders an item, the graphical depiction of that item 47 is displayed in the picture display area 46, as shown in FIG. 7. When the customer orders another item or when the customer has finished ordering, the graphical depiction of the previous item 47 moves to the visual catalog area 43 and is replaced in the picture display area 46 by the graphical depiction of the new item. In the example shown in FIGS. 7 and 8, the graphical depictions of all items ordered by the customer are included in visual catalog area 43, arranged as a meal on a table.

In this embodiment, the graphical depiction of an ordered item 47 as displayed in the picture display area 46 may be an exploded view as shown in FIG. 7 or may be animated to include various aspects of the order as shown in FIG. 8. For example, the animated graphic depiction may illustrate the addition of special ingredients or the removal of unwanted ingredients (such as the removal of pickles and tomato as indicated at 49). Alternatively, the graphic depiction may be a pre-recorded video clip of the ordered item.

The other two display areas on the customer monitor 28 shown in FIG. 4, 7, and 8 are the textual message area 50 and a flexible display area 52. The textual message display area 50 is used by the attendant or other employees, such as the restaurant manager, to display pre-programmed textual messages of interest to the customer. These messages may be programmed into the central computer 34 and are relayed to the customer monitor 28 when the light sensor 38 indicates that a customer 18 is present. The flexible display area 52 may be used for a number of different pre-programmed graphics displays. The graphics may be live video, animated graphics, or static informational or promotional messages.

In one embodiment, the order communication system may be pre-programmed to display an item considered "missing" from the order. For example, if the customer has ordered a sandwich, drink, and french fries, but no dessert, the flexible display area may be used to show the customer a color picture of the restaurant's most popular dessert item.

Figure 5:
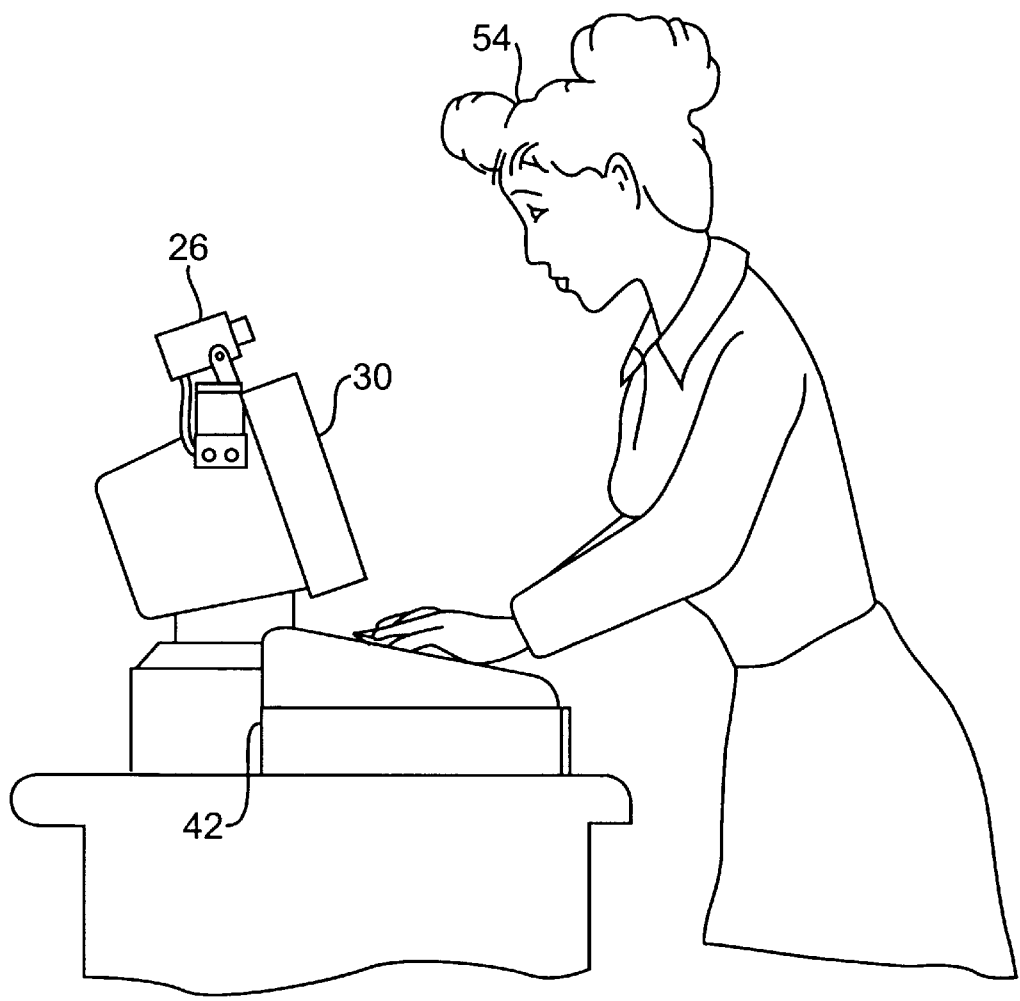
FIG. 5 is a perspective view of one embodiment of an order receiving station included in the order communication system illustrated in FIG. 1.

In one embodiment, the flexible display area is used to present to the customer a live video image of the attendant in the order receiving station 16, as illustrated in FIGS. 7 and 8. In this embodiment, a camera 26 is included in the order receiving station as shown in FIG. 5. The camera 26 is positioned along with an employee monitor 30 conveniently adjacent the data entry device 42 so the attendant 54 may efficiently look down into all three simultaneously. Through the video controller 32 the camera 26 relays a live video of the employee to the customer monitor 28 to give the feeling of personal service.

Figure 6:
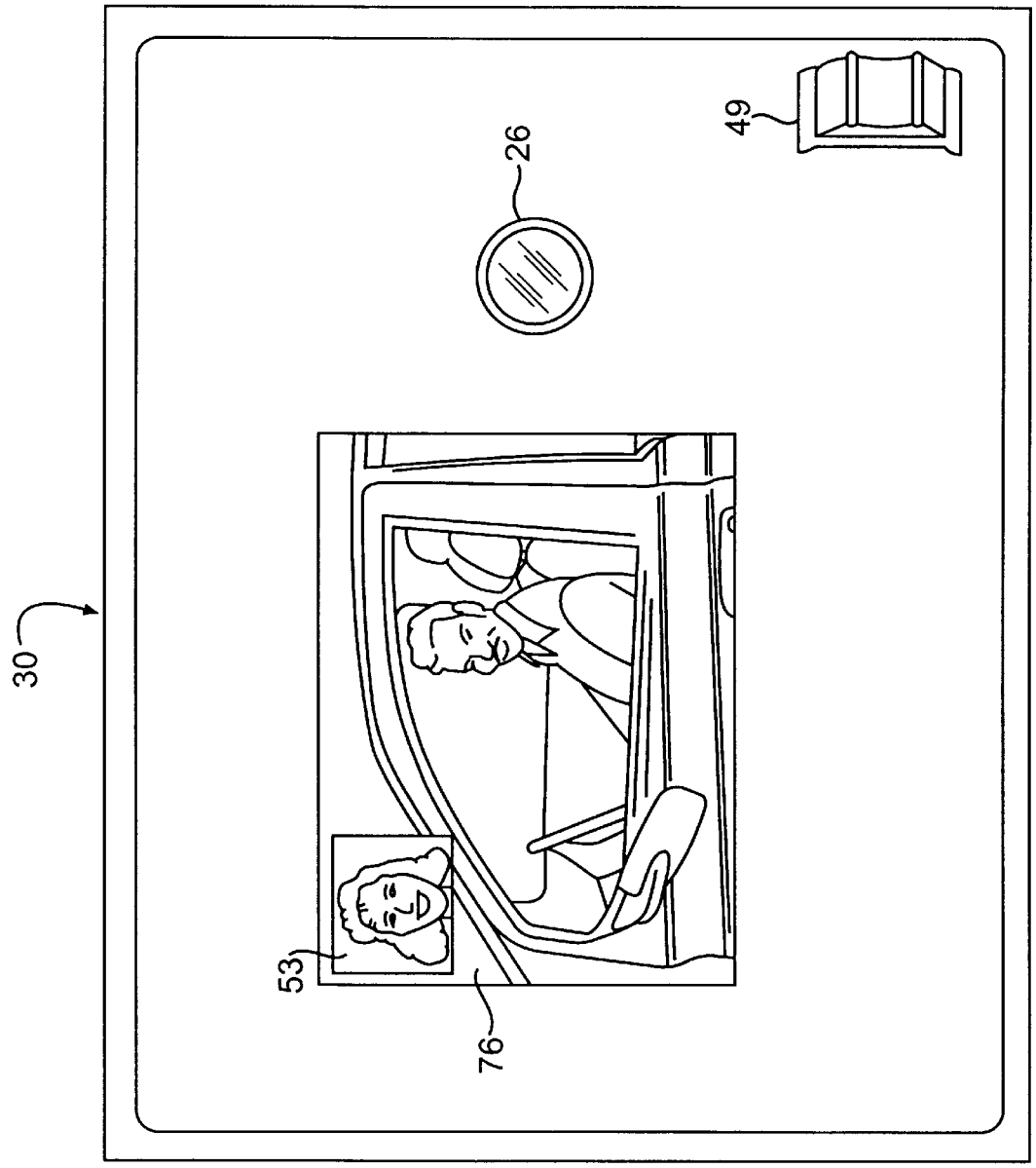
FIG. 6 is a view of one embodiment of an employee monitor included in the order system illustrated in, FIG. 1 showing an exemplary display.

Similarly, in a preferred embodiment, a camera 26 is also included in the order placement station 14 which films a live video of the customer 51 to be relayed to the employee monitor 30 for viewing by the attendant 54. For monitoring purposes, the employee monitor may also include an inset video image 53, commonly called picture-in-picture (PIP), which presents to the attendant 54 a live video image of herself, as shown in FIG. 6. This video may come directly from the camera 26 to the PIP 53 on the employee monitor 30 or, more commonly, the PIP 53 may contain the live video image as it is actually seen by the customer 18 on the customer monitor 28.

The image in the PIP is determined by the video controller 32, through a switching mechanism. In one embodiment, the image is controlled through a switch 49 on the employee monitor as shown in FIG. 6. The employee may also choose to view the image filmed directly from the camera 26 on the entire employee monitor screen for testing. Although a common CRT terminal is depicted in FIG. 5 for employee monitor 30, other types of monitors, such as LCD monitors and VGA monitors, may also be utilized for this purpose. In one embodiment, an LCD monitor 76 is used and is enclosed along with the camera 26 as depicted in FIG. 6.

In one embodiment of the interactive order system, an additional monitor 55 may be included for viewing by the employees responsible for filling the order. In a fast food restaurant, this monitor 55 would be located in the grill area 57, as shown in FIG. 2. The listing of ordered items, displayed in the order list display area 44 of the customer monitor 28 would also appear on the grill monitor 55 to help the grill employees to more efficiently fill orders. The grill monitor 55 is programmed by the central computer 34 through the centralized video controller 32.

Figure 3:
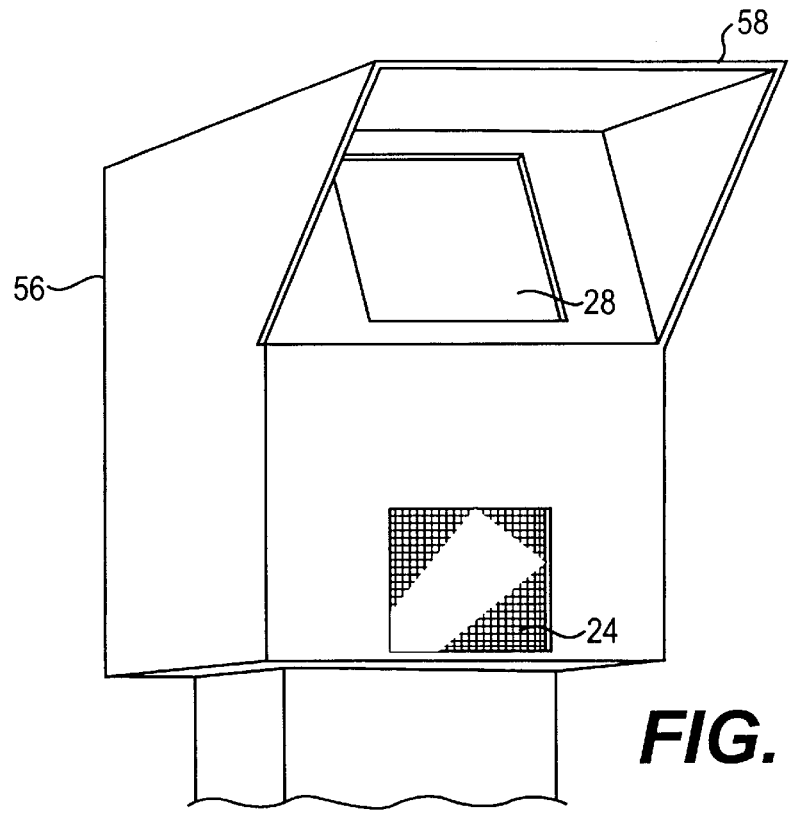
FIG. 3 is a perspective view of one embodiment of an order placement station included in the order communication system illustrated in FIG. 1.

FIG. 3 illustrates one embodiment of the order placement station in which an enclosure 56 houses the customer monitor 28 and the audio speaker 24. The enclosure 56 may also house a camera (not shown). The enclosure 56 protects these components of the order placement station from damaging weather conditions. Additionally, the enclosure 56 provides a roof 58 for the customer monitor 28 to prevent glare from inhibiting a customer's view. As shown in FIG. 3, the entire screen reflects only the dark bottom of the roof 58. FIG. 3 also illustrates how the customer monitor 28 may be positioned at an angle within the enclosure 56 so that the line of sight for the customer diverges for optimal viewing.

Figure 9:
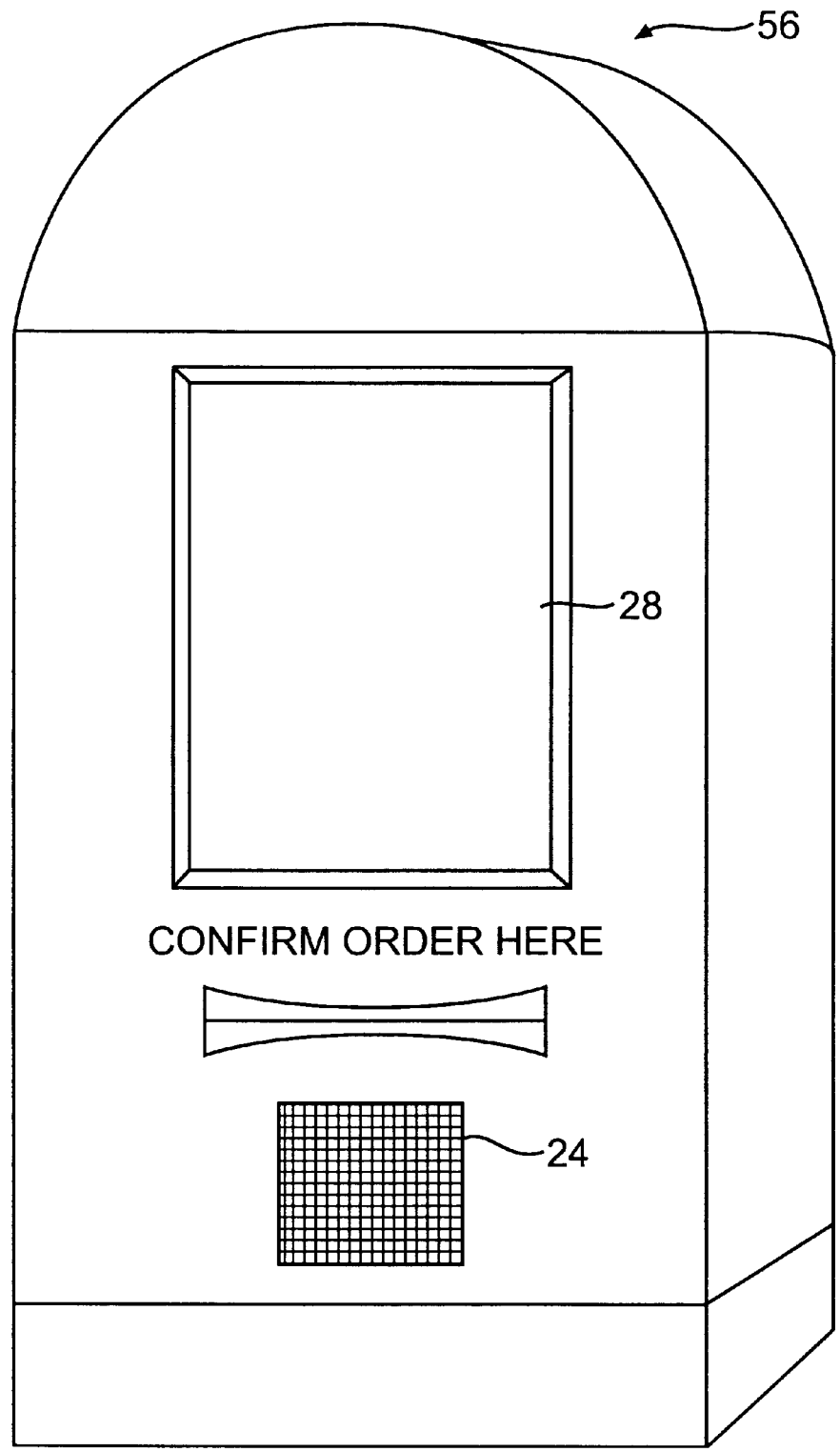
FIG. 9 is a perspective view of one embodiment of an order placement station included in the order communication system illustrated in FIG. 1.

FIG. 9 illustrates another embodiment of the enclosure 56 of the order placement station 14. In this embodiment, the customer monitor 28 is a flat panel presented in portrait mode. The panel includes a light sensor (not shown) which measures the outdoor light and automatically adjusts the brightness of the panel to a level accommodating the amount of outdoor light.

In one embodiment of the interactive order system, a leading customer monitor 60 is provided to be viewed by a customer 62 waiting in the drivethrough line, as shown in FIG. 1. The leading customer monitor 60 typically will display the promotional and informational messages and graphics, the available variety of which was described above in association with the initial display on the customer monitor 28. These displays are similarly selected and preprogrammed by an employee, typically the restaurant manager, using the central computer 34, which may be located in the manager's office 64.

In another embodiment, at least one promotional monitor 66 may be placed in the front of the business establishment for viewing by inside customers. These monitors would likely be positioned adjacent the front counter 68 for the entertainment of customers waiting to place or receive their orders. This embodiment could include any number of monitors 66 placed throughout the business establishment and connected to the central computer 34 for programming through an additional video controller 70.

Similarly, one embodiment of the interactive order system includes at least one additional camera 72 for monitoring the storefront for security purposes. These additional cameras 72 may be positioned adjacent the front counter 68 to record video of waiting customers or the employees working at the counter. The video information would be relayed to the central computer 34 through an additional video controller 74, or could alternatively be connected with video cassette recorders (VCRs) or to a modem or outside network 75 as shown in FIG. 2.

It can thus be seen that the present invention provides an order communication system in which flexible display programming allows the customer to view the order taker and a simultaneous display of pictures of ordered items and a textual or graphical individual catalog of the entire order, while allowing the order taker to view the customer and video image the customer is seeing.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed:

1. An interactive order system having a two-way audio communications system and an order entry device, said order system comprising:

at least one pair of operably connected stations including an order receiving station for accepting input from an employee and an order placement station, remote from said order receiving station, for accepting input from an ordering customer, wherein said two-way audio link connects said order placement station and said order receiving station;

a predetermined catalog of visual representations of menu items, said catalog including at least one graphical depiction for each said menu item;

a customer monitor having means for display of at least one said graphical depiction of each said menu item;

a first means for selecting contents for display on said customer monitor wherein said first selecting means matches an ordered item with one said graphical depiction for said menu item corresponding to said ordered item, using a selection code;

a first video display area for presenting one said graphical depiction of said ordered item most recently chosen by said customer; and a centralized video controller linking said customer monitor and said selecting means whereby said graphical depiction of said ordered item is displayed on said customer monitor.

2. The interactive order system as in claim 1, said customer monitor further comprising:

a second video display area for presenting a graphical catalog of said ordered items, wherein said graphical catalog includes one graphical depiction for each said ordered item chosen by said customer;

a third video display area for presenting a pre-selected visual image;

a fourth video display area for presenting a pre-selected textual message; and a fifth video display area for presenting an order total.

3. The interactive order system as in claim 2, said first means for selecting comprising:

a control processing unit operationally linked with said order entry device and with data storage for said predetermined catalog of visual representations;

a mapping program running on said control processing unit, said mapping program using said selection code to locate said graphical depiction for said ordered item in said data storage; and wherein said selection code is input by use of said order entry device by said employee.

4. The interactive order system as in claim 3, further comprising a plurality of graphics displays and a second means for selecting at least one said graphics display, for transmission to said customer monitor via said video controller.

5. The interactive order system as in claim 4, wherein said video controller includes a vehicle detection sensor, said sensor being activated by the presence of a customer.

6. The interactive order system as in claim 5, whereby said controller transmits a predetermined selection of at least one of said graphics displays to said customer monitor when said sensor is activated.

7. The interactive order system as in claim 4, said customer monitor being operative to present a live video image of said employee to said customer.

8. The interactive order system as in claim 7, further comprising:

an employee monitor within each order receiving station for presenting an image of said ordering customer to said employee, said employee monitor having means for displaying an inset image of said employee wherein said inset image is identical to said employee image presented to said customer;

a first camera for capturing said image of said customer, said first camera positioned within each said order placement station and operationally linked with said employee monitor; and a second camera for capturing said image of said employee, said second camera positioned within each said order receiving station and operationally linked with both said customer monitor and said employee monitor.

9. The interactive order system as in claim 8, said centralized video controller further linking said first camera, said second camera, said customer monitor, said employee monitor, and said first and second means for selecting.

10. The interactive order system as in claim 8, wherein said pre-selected visual image is said live video image of said employee relayed from said second camera.

11. The interactive order systems as in claim 10, wherein said inset image of said employee is a live video image identical to said live video image appearing on said customer monitor.

12. The interactive order system as in claim 2, wherein said pre-selected visual image is a predetermined series of animated graphics selected from said graphics displays using said second means for selecting.

13. The interactive order system as in claim 2, wherein a pre-selected visual image is a predetermined informational video selected from said graphics displays using said second means for selecting.

14. The interactive order system as in claim 2, wherein said pre-selected visual image is a predetermined informational graphic selected from said graphics displays using said second means for selecting.

15. The interactive order system as in claim 2, further comprising means for programming said pre-selected textual message.

16. The interactive order system as in claim 1, wherein said graphical depiction in said first video display area is an exploded view of said ordered item.

17. The interactive order system as in claim 1, wherein said graphical depiction in said first video display area is an animated graphic of said ordered item.

18. The interactive order system as in claim 1, wherein said graphical depiction in said first video display area is a pre-recorded video clip of said ordered item.

19. The interactive order system as in claim 1, said order placement station further comprising an enclosure surrounding said customer monitor and said first camera.

20. The interactive order system as in claim 19, wherein said customer monitor is a flat rectangular panel having a vertical dimension and a horizontal dimension, wherein said vertical dimension is greater than said horizontal dimension.

21. The interactive order system as in claim 19, said customer monitor having the capability to adjust to changes in outdoor light.

* * * * *